US007572054B2

(12) United States Patent
Yonushonis et al.

(10) Patent No.: US 7,572,054 B2
(45) Date of Patent: Aug. 11, 2009

(54) APPARATUS, SYSTEM, AND METHOD FOR DETERMINING A TIME-TEMPERATURE HISTORY OF AN AFTERTREATMENT DEVICE

(75) Inventors: Thomas M. Yonushonis, Columbus, IN (US); Randall J. Stafford, Columbus, IN (US); Conrad J. Simon, III, Columbus, IN (US); Bryan E. Blackwell, Brownsburg, IN (US); Kevin Westerson, El Paso, TX (US)

(73) Assignee: Cummins Filtration IP, Inc, Minneapolis, MN (US)

( * ) Notice: Subject to any disclaimer, the term of this patent is extended or adjusted under 35 U.S.C. 154(b) by 201 days.

(21) Appl. No.: 11/780,332

(22) Filed: Jul. 19, 2007

(65) Prior Publication Data

US 2009/0019833 A1   Jan. 22, 2009

(51) Int. Cl.
*F01N 3/10* (2006.01)
(52) U.S. Cl. ........................................ 374/102; 60/277

(58) Field of Classification Search ................. 374/102; 60/277
See application file for complete search history.

(56) References Cited

U.S. PATENT DOCUMENTS

| 4,007,435 | A * | 2/1977 | Tien ............................. 338/34 |
| 6,597,276 | B1 * | 7/2003 | Chiang et al. ............. 338/22 R |
| 2004/0056753 | A1 * | 3/2004 | Chiang et al. ............. 338/22 R |
| 2008/0163610 | A1 * | 7/2008 | Baird et al. ................... 60/295 |

\* cited by examiner

*Primary Examiner*—Andre J Allen
(74) *Attorney, Agent, or Firm*—Kunzler & McKenzie

(57) ABSTRACT

An apparatus, system, and method are disclosed for determining a time-temperature history of an aftertreatment device. The apparatus includes an aftertreatment device comprising a substrate, and at least one thermal monitoring member (TMM) in thermal contact with the substrate. The TMMs may comprise a material that exhibits an electrical resistivity change at temperature over time. The apparatus may include a controller configured to measure the electrical resistivity of at least a portion of the TMMs, and to determine a thermal history based on the electrical resistivity measures.

33 Claims, 10 Drawing Sheets

APPARATUS, SYSTEM, AND METHOD FOR DETERMINING A TIME-TEMPERATURE HISTORY OF AN AFTERTREATMENT DEVICE

BACKGROUND OF THE INVENTION

1. Field of the Invention

This invention relates to aftertreatment devices for treating engine exhaust streams, and more particularly relates to determining the time-temperature experienced in aftertreatment devices.

2. Description of the Related Art

Emissions regulations for internal combustion engines have changed rapidly in recent years. To meet the new regulations, many engine manufacturers have had to install aftertreatment devices to reduce emissions in the exhaust gases, or to condition the exhaust gases to assist other aftertreatment devices. For example, particulate filters remove soot from the exhaust gases of a diesel engine, and diesel oxidation catalysts are sometimes used to generate temperature in the exhaust gas to assist a particulate filter in oxidizing the soot off of the filter.

Most aftertreatment devices experience thermal cycles during the operations of the engine. The thermal cycles may be intentional, for example during the removal of soot from a particulate filter, or unintentional such as when the engine experiences large changes in the required workload for the engine. As the aftertreatment devices experience thermal cycles, the physical characteristics of the device can degrade over time. For example, stresses on the substrate of the device experience wear and thermal fatigue, while catalytic aspects of the device may experience thermal degradation and deactivation.

The combination of time and temperature experienced by the aftertreatment device is particularly difficult to detect. There are no direct measurements routinely used in real-time for applications to detect temperatures within an aftertreatment device. The internal temperatures of the device are the most significant in terms of degradation, and the most difficult in terms of measuring. Even when an aftertreatment device removed from an application for service and can be observed directly, there are no current techniques to estimate the time-temperature history of the device. Catastrophic failures, such as the melting of an aftertreatment device during an extreme temperature event, can often be detected visually. However, excessive device degradation due to high average temperatures the service life of the device cannot be detected using current technologies.

The current inability to measure the time-temperature history of aftertreatment devices limits the serviceability of these devices, increases the total cost of operating aftertreatment devices, and increases the possibility of an aftertreatment device failing unexpectedly and causing emissions increases. If an aftertreatment device is removed from an application and replaced with a cleaned aftertreatment device, there is currently a significant risk that an aftertreatment device with a dissimilar history and remaining service life will be installed as a replacement. Further, applications using aftertreatment devices will have to be designed with extra operating margin, in terms of catalyst loading and usable service life, to prevent failures because the operating history of a device cannot be measured. Finally, if a device is used excessively and experiences a non-catastrophic failure, there is currently no method to estimate this occurrence and failure or substandard operation can occur.

SUMMARY OF THE INVENTION

From the foregoing discussion, applicant asserts that a need exists for an apparatus, system, and method that records the time-temperature history of an aftertreatment device. Beneficially, such an apparatus, system, and method would provide an estimate of the overall thermal degradation incurred on the device, and provide an estimate of average temperature gradients experienced within the device.

The present invention has been developed in response to the present state of the art. Accordingly, the present invention has been developed to provide an apparatus, system, and method for determining a time temperature history of an aftertreatment device that overcome many or all of the above-discussed shortcomings in the art.

An apparatus is disclosed for determining a thermal history of an aftertreatment device. The apparatus may include an aftertreatment device comprising a substrate and a plurality of channels, and at least one thermal monitoring member (TMM). Each thermal monitoring member comprises an element disposed within one of the channels, and a conductive material that exhibits an electrical resistivity change upon exposure to temperature over a period of time.

The apparatus may further include a plurality of access points conductively coupled to each of the thermal monitoring members. In one embodiment, the apparatus further includes an electronic control module (ECM) including a plurality of modules configured to functionally execute measuring a resistance value of at least a portion of at least one of the TMMs, and to determine a thermal history of the aftertreatment device based on the electrical resistance value(s). The ECM may include an electrical resistance measurement module, an electrical resistivity module, a thermal history module, and a device usage display module.

The electrical resistance measurement module may be configured to interpret an electrical resistance value of at least one portion of the at least one thermal monitoring member. The electrical resistivity module may be configured to calculate an electrical resistivity value for each portion of the TMMs based on the electrical resistance value of each portion of the TMMs. The thermal history module may be configured to determine a thermal history of the aftertreatment device based on the electrical resistivity value for each portion of the at least one thermal monitoring member. The thermal history module may be further configured to determine a device usage category based on the thermal history. The device usage display module may be configured to provide the device usage category to a display outlet.

A method is disclosed for determining a thermal history of an aftertreatment device. In one embodiment, the method may include providing an aftertreatment device comprising a particulate filter. The method may further include providing TMMs, each disposed within a channel of the aftertreatment device at a distinct radial distance from the center of the device. The method may include removing each TMM and measuring an electrical resistance value of at least a portion of each TMM. The method may further include calculating an electrical resistivity value of each TMM. The method may include determining a thermal history based on the electrical resistivity values. The method may further include marking each TMM with a representation of the number of times each TMM has been replaced, and replacing each TMM with a new TMM. The method may further include providing the thermal history to an ECM on an application comprising the aftertreatment device. The method may also include replacing the particulate filter with a particulate filter comprising an equivalent device usage category.

In one embodiment, the method includes providing an aftertreatment device, and providing at least two sets of three TMMs, each set disposed within channels of the aftertreatment device at a distinct radial distance from the center of the aftertreatment device. The method may further include measuring each TMM electrical resistance value at a plurality of access points, and an electrical resistivity module calculating an electrical resistivity value of each TMM. The method may further include a thermal history module determining a thermal history based on the electrical resistivity values. The method may further include an ECM setting a control flag comprising one of a fault value and a service notification based on the electrical resistivity value for each TMM.

A system for determining a thermal history of an aftertreatment device is disclosed. The system includes an aftertreatment device comprising a substrate and a plurality of channels, at least one TMM, each TMM comprising an element disposed within one of the channels and an electrically conductive material that exhibits a resistivity change upon exposure to temperature over a period of time. The system further includes a controller comprising an electrical resistance measurement module, an electrical resistivity module, and a thermal history module. The controller may further comprise a device usage display module. The controller may be an ECM and/or a system tool.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in FIGS. 1 through 10, is not intended to limit the scope of the invention, as claimed, but is merely representative of selected embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
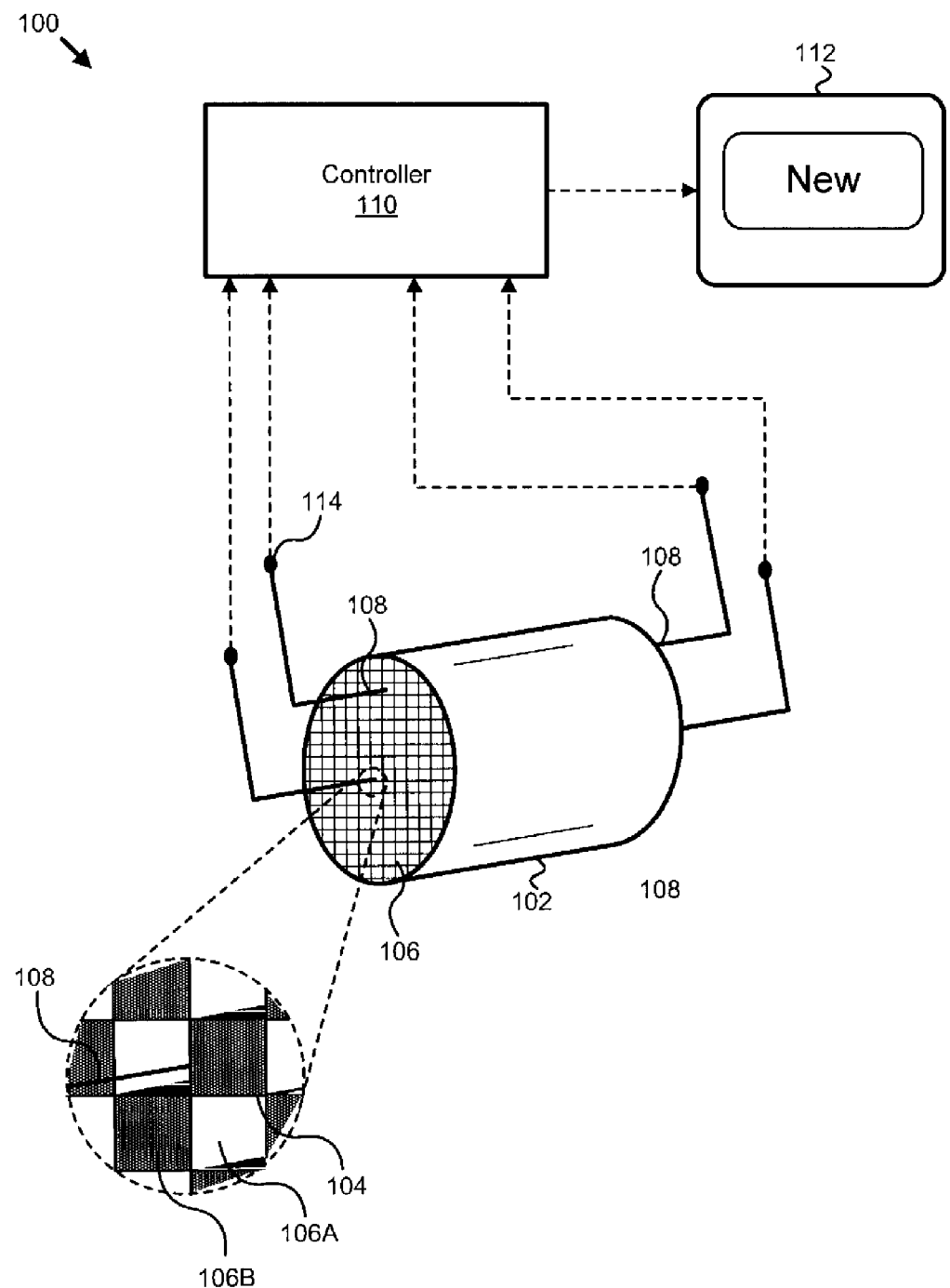
FIG. 1 is a system diagram depicting one embodiment of a system for determining a thermal history of an aftertreatment device in accordance with the present invention.

FIG. 1 is a system diagram depicting one embodiment of a system 100 for determining a thermal history of an aftertreatment device in accordance with the present invention. The system 100 comprises an aftertreatment device 102 comprising a substrate 104 and a plurality of channels 106 (may also be called cells 106). The aftertreatment device 102 may be a device to treat the exhaust gases of an internal combustion engine (not shown).

In one embodiment, the aftertreatment device 102 may be a particulate filter with wall-flow channels, wherein some of the channels 106A are open on the front end and allow exhaust flow into the channel 106A, and some of the channels 106B are plugged on the front end and do not allow exhaust flow into the channel 106B. The channels 106A may be plugged on the back end, while the channels 106B may be open on the back end, such that exhaust flow is forced from an inlet channel 106A through the substrate 104 wall into an exhaust channel 106B to exit the aftertreatment device 102. The aftertreatment device 102 may also be a flow-through device, with channels 106 open for flow straight through the device. The aftertreatment device 102 may also comprise, without limitation, a diesel oxidation catalyst, a $NO_x$-adsorption catalyst, a three-way catalyst, a four-way catalyst, a selective catalytic reduction device, and the like. In one embodiment, the aftertreatment device 102 comprises a porous foam matrix where exhaust flows through interconnected porosity and thereby deposits soot on the walls.

The system 100 may further comprise at least one thermal monitoring member (TMM) 108. Each TMM 108 may comprise an element in thermal contact with the substrate. In one embodiment each TMM 108 may be disposed within one of the channels 106A. In one embodiment, each TMM 108 may be disposed within the substrate by being formed within a porous matrix. In one embodiment, a TMM 108 may be an etched or plated metal on the outer surface of the substrate. The etched or plated metal may be about 0.1 mm in thickness, or thicker. The element may be a wire, a formed structure, a deposited material, an etched or plated material, and the like. A wire TMM 108 may be between about 0.4 mm 4.0 mm, although smaller and/or larger wires may be used in some applications. Each TMM 108 may further comprise an electrically conductive material that exhibits an electrical resistivity change upon exposure to temperature over a period of time. Electrical resistivity is the intrinsic electrical resistance of a material, or the electrical resistance per unit length for a given cross-sectional area. Electrical resistivity is also sometimes called specific electrical resistance. In some materials, electrical resistivity may increase with exposure to temperature, decrease with exposure to temperature, or follow a trajectory with exposure to temperature that may include periods of increasing and/or decreasing electrical resistivity.

The electrically conductive material may be selected such that the electrical resistivity change occurs over at a temperature of interest in a period of time of interest for the system 100. The period of time of interest for the system 100 may comprise a service interval, a useful life of the aftertreatment device 102, an emissions regulatory period, a minimum time indicative of a special regeneration event, and/or any other period of time of significance for a given system 100.

For example, if the aftertreatment device 102 changes properties significantly at temperatures above 600 deg C., and is expected to experience about 300 hours of exposure to temperatures above 600 deg C. during a service interval, an electrically conductive material may be selected that changes electrical resistivity at temperatures above 600 deg C. for at least about 300 hours. In the example, an electrically conductive material that stops changing after exposure to temperatures above 600 deg C. for only ten minutes, or a material that does not experience any significant change in electrical resistivity except above 900 deg C., may not be appropriate for the system 100. In a second example, the system 100 may have a requirement to perform a special regeneration in the aftertreatment device 102 from sulfur contamination at a temperature above 700 deg C. for brief periods each several hundred operating hours. An electrically conductive material that significantly changes electrical resistivity only above 700 deg C. may be selected for a TMM 108 to evaluate whether an appropriate amount of special regeneration is performed by the system 100. The phenomenon of an electrically conductive material that stops changing after exposure to temperature is referred to as electrically resistive saturation herein.

The system 100 may further comprise a controller 110 configured to determine the thermal history of the aftertreatment device 102. The controller 110 may comprise modules configured to functionally execute determining the thermal history of the aftertreatment device 102. The controller 110 may include an electrical resistance measurement module, an electrically resistivity module, and a thermal history module. The controller 110 may further determine a device usage category, for example "new," "light usage," "heavy usage," and "failed." The controller 110 may further comprise a device usage display module, and may provide the device usage category and/or thermal history to a display outlet 112. The display outlet 112 may comprise a dashboard lamp, a network data value, and/or a communicated signal.

Figure 2:
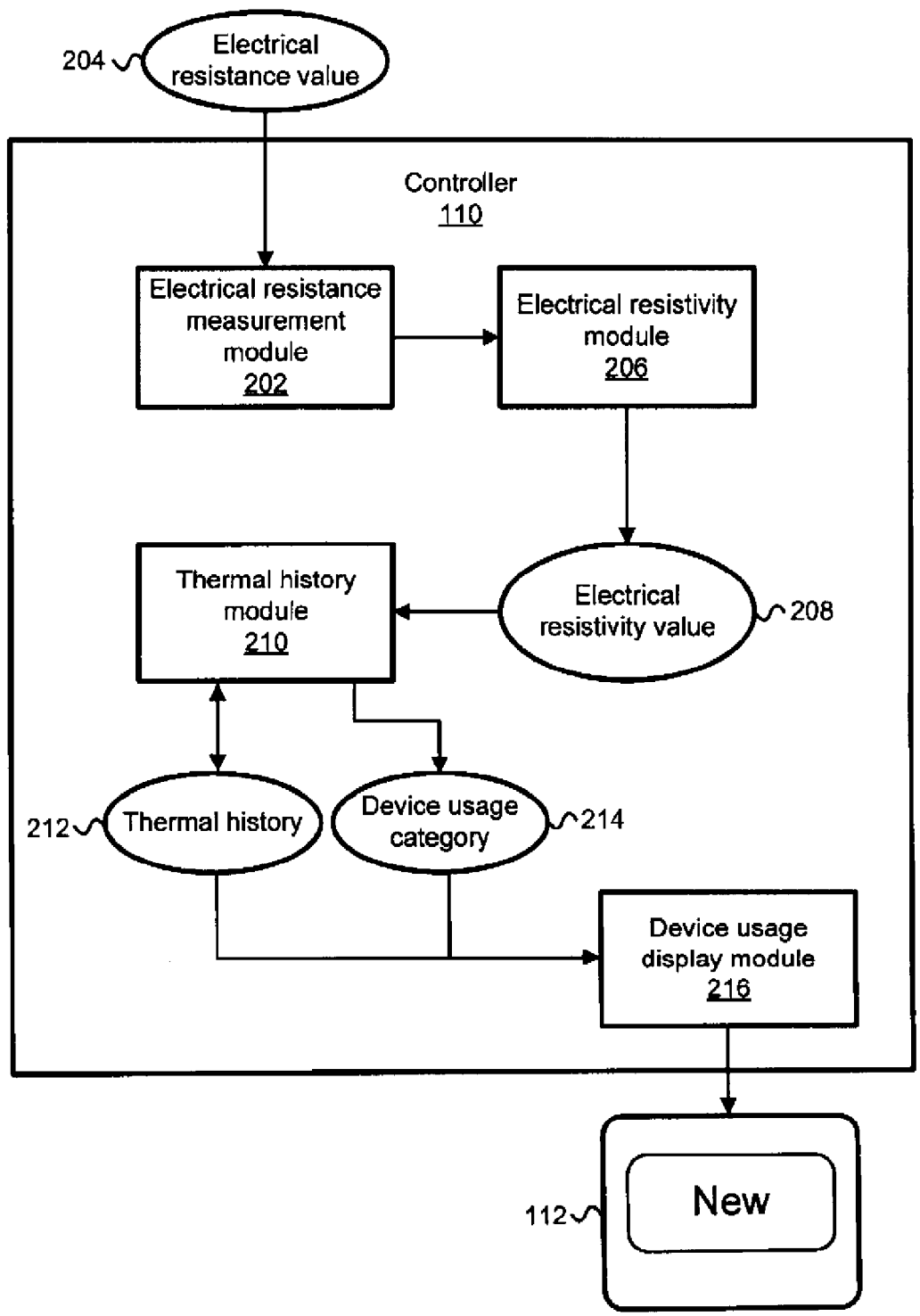
FIG. 2 is a schematic block diagram 200 depicting one embodiment of a controller for determining the thermal history of an aftertreatment device in accordance with the present invention.

FIG. 2 is a schematic block diagram depicting one embodiment of a controller 110 for determining the thermal history of an aftertreatment device 102 in accordance with the present invention. The controller 110 comprises an electrical resistance measurement module 202 configured to interpret an electrical resistance value 204 of at least a portion of the TMM(s) 108. Interpreting the electrical resistance value(s) 204 may comprise reading the value from a datalink (not shown) parameter, reading a stored memory value on a computer, calculating an electrical resistance value from a voltage reading, and/or reading an electrical resistance value from an ohm-meter or a multi-meter. Further, interpreting the electrical resistance value(s) 204 may comprise reading a voltage and/or current value from which an electrical resistance value 204 may be calculated.

The TMM(s) 108 may each be electrically coupled to a plurality of access points 114 and the electrical resistance value(s) 204 may be interpreted from an electrical resistance and/or voltage measurement between the access points 114. In one embodiment, interpreting the electrical resistance value(s) 204 comprises removing each TMM 108 from the aftertreatment device 102, measuring the electrical resistance of a plurality of specified intervals of each TMM 108. For example, a TMM 108 may comprise a 12-inch wire disposed within a channel 106 of the aftertreatment device 102, and interpreting the electrical resistance value(s) 204 comprises removing the TMM 108 from the aftertreatment device, and measuring the electrical resistance of each 1-inch segment of the TMM 108.

The controller 110 comprises an electrical resistivity module 206 configured to calculate an electrical resistivity value 208 for each portion of the TMM(s) 108 based on the electrical resistance value(s) 204 of each portion of the TMM(s) 108. In one embodiment, the electrical resistivity module 206 may calculate the electrical resistivity value 208 of each portion of each TMM 108 by dividing the electrical resistance value 204 of the each portion of each TMM 108 by an axial length of the portion of the TMM 108.

In one embodiment, a first portion of a TMM 108 may differ from a second portion of the TMM 108 in cross-sectional area, and the electrical resistivity module 206 may be configured to correct the electrical resistivity values 208 to a selected standard cross-sectional area, where TMM 108 portions comprising a larger cross-sectional area may be corrected to a proportionally higher electrical resistivity value 208, and TMM 108 portions comprising a smaller cross-sectional area may be corrected to a proportionally lower electrical resistivity value 208.

The use of a larger cross-sectional area for a TMM 108 may lower the overall electrical resistance in electrically conductive materials with a relatively high electrical resistance value. The use of larger cross-sectional areas also generally extends the time to electrically resistive saturation for a given electrically conductive material and temperature.

The controller 110 further comprises a thermal history module 210 configured to determine a thermal history 212 of the aftertreatment device 102 based on the electrical resistivity value(s) 208. The thermal history module 210 may be further configured to determine a device usage category 214 based on the thermal history 212.

In one embodiment, the thermal history 212 may comprise a single value based on the electrical resistivity value(s) 208. In a first example, the thermal history 212 may comprise "80 hours" where 80 hours is a time required at a specified temperature to generate an equivalent electrical resistivity value (not shown) to the observed electrical resistivity value 208. In the first example, the electrical resistivity value 208 may be 100 units, and a new TMM 108 may experience an electrical resistivity value of 100 units after 80 hours at 800 deg C. based on lab data.

In a second example, the thermal history 212 may comprise "670 deg C." where 670 deg C. is a temperature required at a specified time to generate an equivalent electrical resistivity value to the observed electrical resistivity value 208. In the second example, the electrical resistivity value may be 100 units, the specified time may be 200 hours, and a new TMM 108 may experience an electrical resistivity value of 100 units after 200 hours at 670 deg C. based on lab data. The specified time may be selected from an engine operating time, a total time of regeneration attempts for the system 100, and/or any other time value in the system 100 which may be related to the degradation on the aftertreatment device 102.

In addition to the described embodiments and examples, various embodiments are possible basing a thermal history 212 on electrical resistivity values 208 of portions of TMM(s) 108, and/or on electrical resistivity values 208 of multiple TMMs 108. These embodiments are mechanical steps for one of skill in the art based on the disclosures herein, and are contemplated within the scope of the present invention. The thermal history 212 may comprise multiple values based on multiple electrical resistivity values 208, and/or multiple values stored periodically and/or episodically. Episodes may comprise regeneration events, engine operation events, service events, and/or vehicle operation events. For example, a service technician may record a thermal history 212 as multiple values by determining a series of entries based on the electrical resistivity values 208 in a service log book, and/or an electronic control module (ECM) 110 may record a thermal history 212 as multiple values by determining a series of data values based on the electrical resistivity values 208 in a memory location.

The thermal history module 210 may be further configured to determine a device usage category 214 based on the thermal history 212. The device usage category 214 may comprise a word and/or numerical description comprising the overall usage of the aftertreatment device 102. The device usage category 214 may comprise a description of one or more types of usage of the aftertreatment device 102. For example, the device usage category 214 may indicate an overall degradation category of the device such as "New" or "Degraded," or the device usage category 214 may indicate multiple types of usage such as "Lightly degraded, high average temperatures", or "Heavily degraded, low average temperatures, high average thermal gradients." A device usage category 214 comprising a numerical description may comprise a mapping of numerical values to category descriptions, for example "0=New, 1=Failed" and the like. The controller 110 may further comprise a device usage display module 216 configured to provide a device usage category 214 to a display outlet 112.

In one embodiment, the controller 110 may comprise an ECM 110 comprising an electrical resistance measurement module 202 configured to measure electrical resistance values 204 for one or more TMMs 108. The ECM 110 may further comprise an electrical resistivity module 206 configured to calculate an electrical resistivity value 208 for each TMM 108 based on the electrical resistance values 204. The ECM 110 may comprise a thermal history module 210 configured to store a thermal history 212 comprising one or more electrical resistance values 204 and/or data parameters derived from the one or more electrical resistance values 204. The thermal history module 210 may further determine a device usage category 214 based on the thermal history 212. The ECM 110 may further comprise a device usage display module 216 configured to provide the device usage category 214 and/or thermal history 212 to a display outlet 112. For example, the ECM 110 may light a lamp in a vehicle to indicate a service recommendation according to the device usage category 214, and the ECM 110 may publish the thermal history 212 and/or the device usage category 214 to a datalink (not shown) in communication with a service tool. In one embodiment, the ECM 110 may set a control flag based on the electrical resistivity value 208 for each portion of the TMM(s) 108, where the control flag may be a fault value and/or a service notification.

In one embodiment, the controller 110 may comprise a service tool 110 comprising an electrical resistance measurement module 202 configured to measure electrical resistance values 204 for one or more TMMs 108. The service tool 110 may be configured to measure electrical resistance values 204 for one or more TMMs 108 by accessing a plurality of access points 114 and/or by touching leads from a meter in communication with the service tool 110 to read the electrical resistance value 204 across at least a portion of the TMM(s) 108. The service tool 110 may comprise a thermal history module 210 configured to store a thermal history 212 comprising one or more electrical resistance values 204 and/or data parameters derived from the one or more electrical resistance values 204. The service tool 110 may further comprise a device usage display module 216 configured to provide the device usage category 214 and/or thermal history 212 to a display outlet 112. In one embodiment, the service tool 110 communicates the device usage category 214 to a display screen 112 where a service technician reads the device usage category 214 from the screen 112.

In one embodiment, the controller 110 comprises a service technician, an ohm-meter and/or multi-meter, a calculator, and a device usage category 214 lookup table (not shown). The service technician measures the electrical resistivity value 204 of at least a portion of one or more TMMs 108, and determines the electrical resistivity value(s) 208 utilizing the electrical resistance value(s) 204, the length of the portion of the TMM(s) 108, correcting for cross-sectional area as required. The service technician then consults the lookup table using the electrical resistivity value(s) 208 to determine the device usage category 214. In one embodiment, the aftertreatment device 102 comprises a particulate filter, and the service technician replaces the old particulate filter 102 with a cleaned particulate filter 102 comprising an equivalent device usage category 214 in response to a service event.

Figure 3:
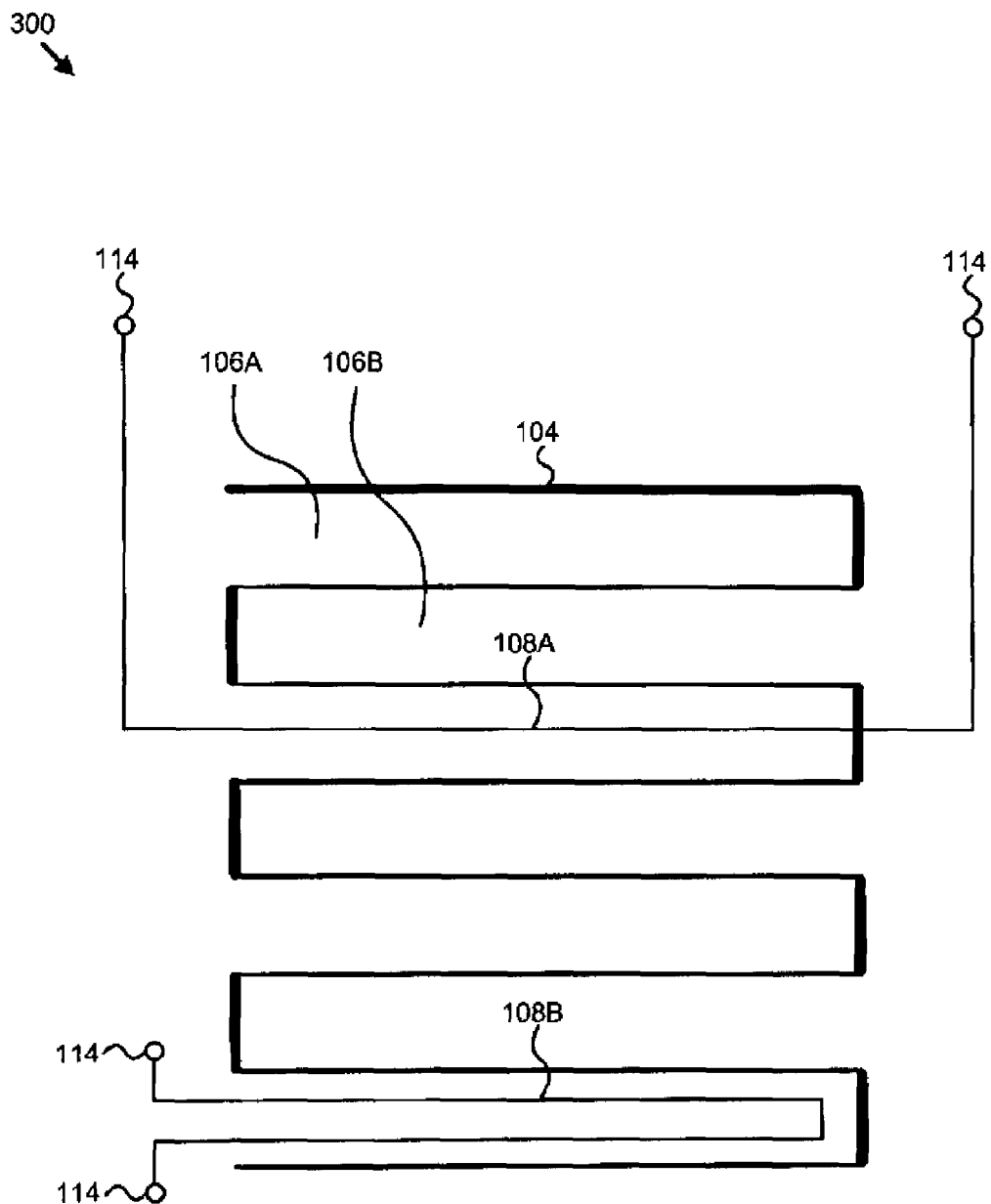
FIG. 3 is an illustration depicting one embodiment of thermal monitoring members disposed within channels of an aftertreatment device in accordance with the present invention.

FIG. 3 is an illustration depicting one embodiment of TMMs 108 disposed within channels 106A, 106B of an aftertreatment device in accordance with the present invention. The TMMs 108A may be disposed through the axial length of a channel 106 and be electrically coupled to a plurality of access points 114. In one embodiment, the TMMs 108B may be configured as a "U" within a channel 106 and electrically coupled to a plurality of access points 114. The channels 106 with an open end on the left side, which may be the front of the aftertreatment device 102 are marked 106A, and the channels 106 with an open end on the right side, which may be the rear of the aftertreatment device 102 are marked 106B. Not all of the channels 106 are marked in FIG. 3 to prevent unnecessary clutter on the Figure.

In one embodiment, the TMMs 108A, 108B may not be electrically coupled to access points 114, as, for example, when the TMMs 108 are to be removed in a particular embodiment and measured outside the aftertreatment device 102. As described in description referencing FIG. 1, the TMMs 108 may comprise wires, formed structures, and/or embedded, plated, or deposited electrically conductive material disposed within the channels 106. The TMMs 108 may comprise any electrically conductive material that exhibits an electrical resistivity change over time with exposure to temperature. Some materials that are known to exhibit electrical resistivity changes in temperature ranges and time scales relevant to common aftertreatment device applications are Alumel®, Chromel®, stainless steel, Nichrome, Monel®, constantan, aluminum based alloys, copper based alloys, iron based alloys, nickel based alloys, and chromium based alloys.

The material selection for a given embodiment can be tested according to the specific system 100 of interest and cannot be defined in advance because the thermal transfer characteristics of the aftertreatment device 102, the thickness and form of the TMMs 108, and the temperature delivery characteristics of the related engine (not shown) vary with each application. However, it is a mechanical step for one of skill in the art to install one or more candidate TMMs 108 in a specific aftertreatment device 102, perform a standardized aging of the aftertreatment device 102 by application of temperature over time according to the expected application of the system 100 in use, and measure the electrical resistivity of the candidate TMMs 108 at specified axial intervals to plot an aging versus electrical resistivity curve for a specific system 100 and TMM 108. Note that the electrical resistivity may be measured as a voltage change over time and/or as a current change over time. The conversions between voltages, currents, and resistances are equivalents and well understood by one of skill in the art.

Figure 4:
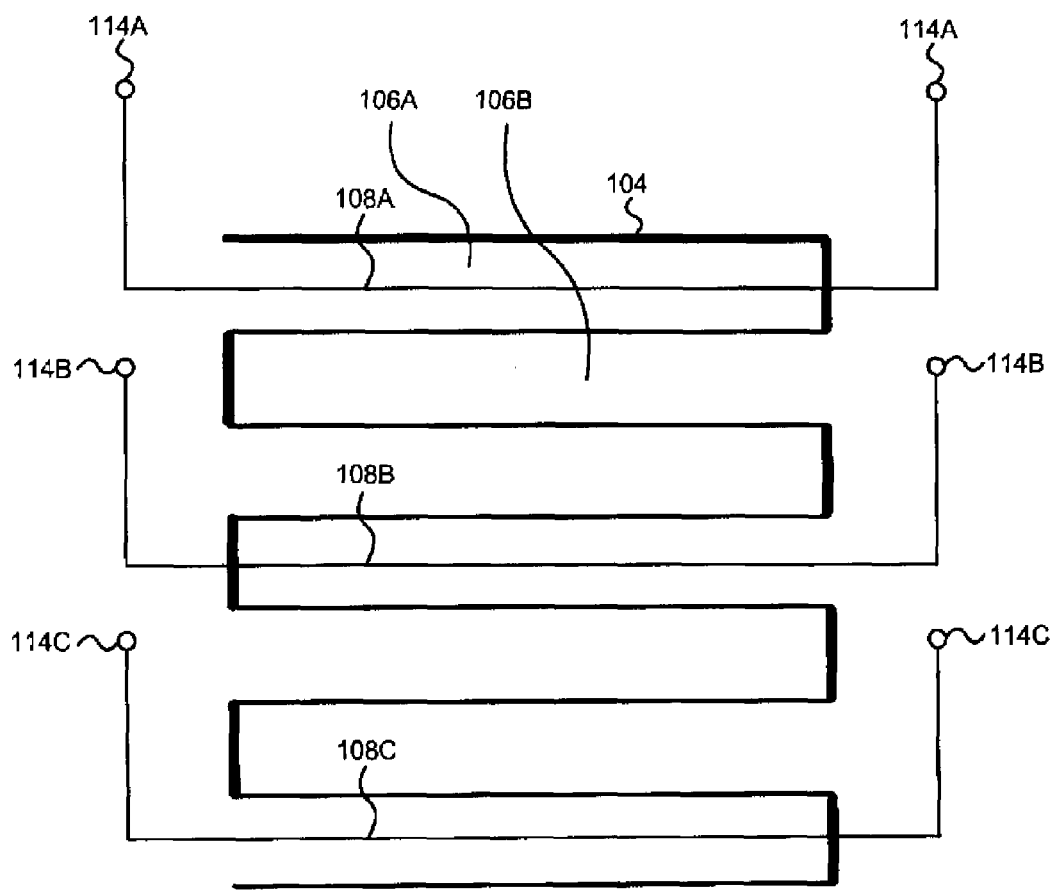
FIG. 4 is an illustration depicting one embodiment of thermal monitoring members disposed within channels of an aftertreatment device in accordance with the present invention.

FIG. 4 is an illustration depicting one embodiment of TMMs 108A, 108B, 108C disposed within channels 106 of an aftertreatment device 102 in accordance with the present invention. The thermal history 212 may comprise a thermal gradient history for the aftertreatment device 102. In one embodiment, the TMMs 108A, 108B, 108C comprise TMMs 108 positioned at a distinct radial distance from a center of the aftertreatment device 102. The distinct radial positioning of the TMMs 108A, 108B, 108C allows some information about the average thermal gradients experienced by the aftertreatment device 102. In many applications, the physical stresses imposed on the aftertreatment device 102 from temperature are dominated by the radial temperature gradient.

In one example, a thermal history 212 in one instance of a system 100 comprising a value of "670 deg C." for TMM 108A, "650 deg C." for TMM 108B, and "630 deg C." for TMM 108C, may be deemed acceptable for an application, while a thermal history 212 in another instance of the system 100 comprising a value of "670 deg C." for TMM 108A, "550 deg C." for TMM 108B, and "400 deg C." for TMM 108C, may be deemed unacceptable for the application. The thermal history 212 values which may indicate acceptable and/or unacceptable thermal gradients for a system 100 can be determined by taking a straightforward data set in an aftertreatment device 102 wherein an acceptable and an unacceptable radial temperature gradient are applied.

In one embodiment, the three TMMs 108A, 108B, 108C comprise electrically conductive materials that exhibit a distinct electrical resistivity change upon exposure to temperature over a period of time. The access points 114A, 114B, 114C may be marked or labeled to identify the specific TMM 108A, 108B, 108C to which the access point 114A, 114B, 114C is electrically coupled. The use of electrically conductive materials exhibiting a distinct electrical resistivity change may increase the operating range for determining the thermal history 212, wherein the operating range may be the temperature range or a time scale range.

For example, a baseline TMM 108A may comprise an electrically conductive material that is expected to provide useful electrical resistivity information for the expected temperatures and designed service intervals of the system 100. In the example, a second TMM 108B may comprise an electrically conductive material that will provide useful electrical resistivity information for the expected temperatures of the system 100, for even longer than the designed service intervals. Also in the example, a third TMM 108C may comprise an electrically conductive material that will provide useful electrical resistivity information at temperatures higher than the expected temperatures of the system 100. In the example, if an operator for an engine (not shown) related to the system 100 misses a service interval, the electrical resistivity change of the second TMM 108B may nevertheless provide useful thermal history information even if the first TMM 108A experiences an electrically resistive saturation. Also in the example, if the aftertreatment device 102 experiences an unusual temperature event, the third TMM 108C may nevertheless provide useful thermal history information.

In one embodiment, the baseline TMM 108A may be measured during operation by an ECM 110, while the second TMM 108B and third TMM 108C may be measured by a service technician during a service event. In one embodiment, a baseline TMM 108A may comprise a thin Alumel® wire about 0.4 millimeters (mm) thick, the second TMM 108B may comprise a thick Alumel® wire about 0.8 mm thick, and the third TMM 108C may comprise a Chromel® wire. The use of multiple materials provides improved resolution over the use of a single material that will not saturate for virtually any temperature or time experienced by the system 100. This is because electrical resistance measurement noise makes it desirable to select a material that experiences the maximum electrical resistivity change without experiencing resistive saturation. For example, the net of electrical resistance measurement error and specified axial interval measurement error—in an embodiment measuring axial segments of a TMM 108—will introduce a noise of a specific magnitude on the error measurement. If the signal value is larger—i.e. the change in electrical resistance experienced by the portion of the TMM 108—then the percentage value of measurement error is lower. Conversely, if the signal value is smaller then the percentage value of measurement error is higher. The decisions for materials to use, the specific purposes of the use of multiple TMMs 108 for a given embodiment of the invention, and whether specific TMMs 108 are measured during operation of the system and/or during service intervals are mechanical steps for one of skill in the art based on the disclosures herein.

Figure 5:
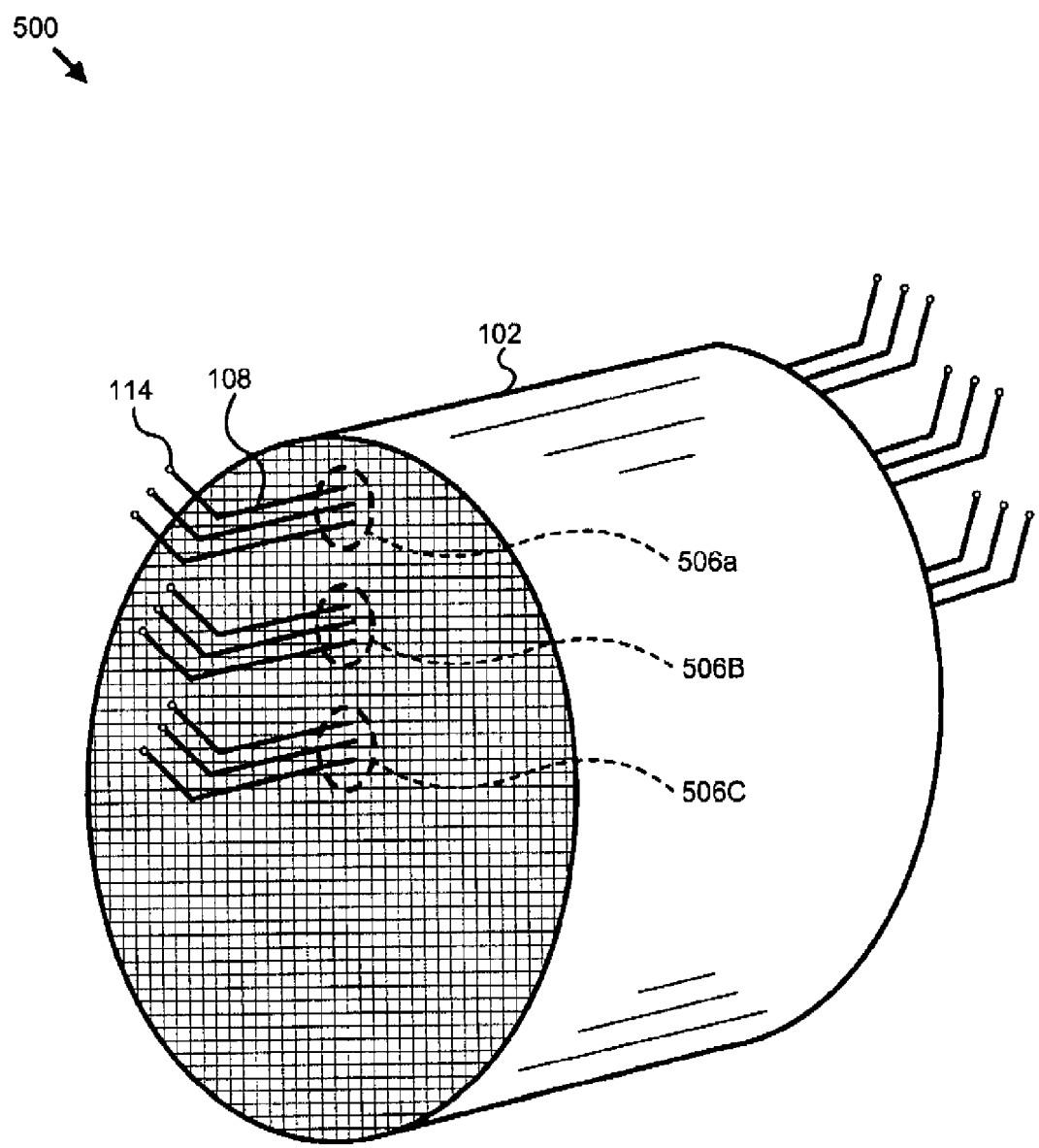
FIG. 5 is an illustration depicting one embodiment of a at least two sets of at least three thermal monitoring members disposed within channels of an aftertreatment device in accordance with the present invention.

FIG. 5 is an illustration depicting one embodiment of a at least two sets 506A, 506B, 506C of at least three TMMs 108 disposed within channels 106 of an aftertreatment device 102 in accordance with the present invention. In one embodiment, each of the three sets 506A, 506B, 506C of TMMs 108 comprise TMMs 108 with equivalent electrical conducting materials to the other sets 506A, 506B, 506C. In a further embodiment, each of the three sets 506A, 506B, 506C may be positioned at a distinct radial distance from a center of the aftertreatment device 102. For example, each set 506A, 506B, 506C may comprise a thin Alumel® wire, a thick Alumel® wire, and a thin Chromel® wire. The TMMs 108 of set 506A may be placed in a similar radial location to each other, and in a distinct radial location from each of the other sets 506B, 506C. The use of the sets 506A, 506B, 506C gives the advantages of thermal gradient detection, as well as the operating range extension from using multiple electrically conductive materials for the TMMs 108. In one embodiment, the thermal history 212 may comprise a device usage value for each of the distinct radial distances.

Figure 6:
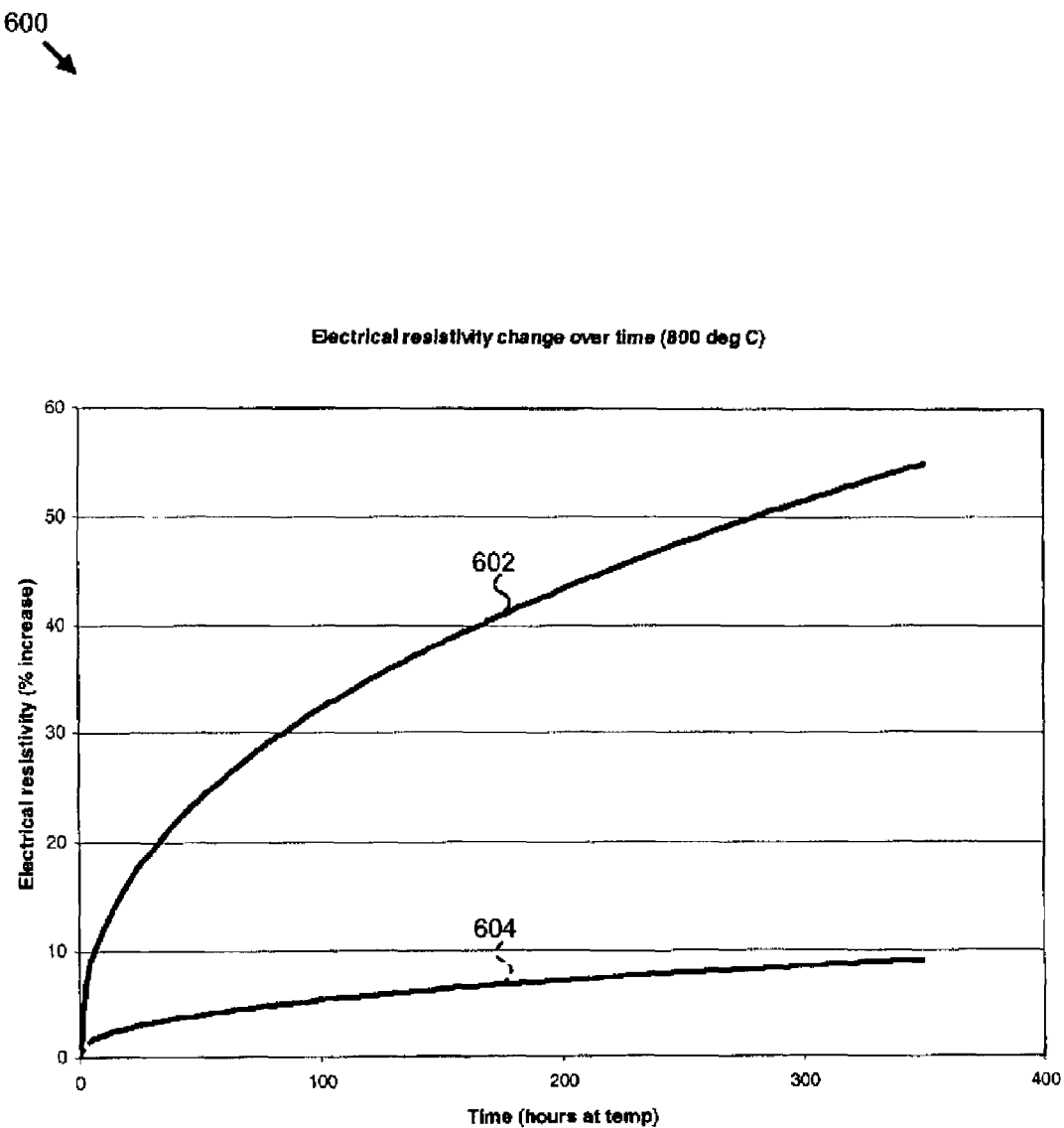
FIG. 6 is a graph depicting an electrically conductive material that exhibits an electrical resistivity change upon exposure to temperature over a period of time in accordance with the present invention.

FIG. 6 is a data set 600 comprising a graph depicting an electrically conductive material that exhibits an electrical resistivity change upon exposure to temperature over a period of time in accordance with the present invention. The higher curve 602 comprises a trend line through a dataset for an Alumel® wire at 800 deg C. The lower curve 604 comprises a trend line through a dataset for a Chromel® wire at 800 deg C. The thickness of the wire, the level of oxygen in the ambient environment of the wire, and the heat transfer to the wire (e.g. the thermal conduction environment) may affect the curves 602, 604 for a given embodiment. Data for a specific embodiment similar to that shown in FIG. 6 is readily available or obtainable for a given system 100.

Note that a single data set such as shown in FIG. 6 may be sufficient where the thermal history 212 comprises a time, but that various data sets over a range of temperatures may be required where the thermal history 212 comprises a temperature equivalent. Also note that the time axis shown in FIG. 6 is shown up to about 350 hours. In a system 100 within a motor vehicle application, 350 operating hours is perhaps only 17,500 miles. However, if the temperature of 800 deg C. is only expected to be achieved for an average of 4 min of every hour, then the graph 600 may be expected to cover 262,500 miles for a motor vehicle application. It is within the skill of one in the art to obtain or build a data set 600 over an appropriate time scale to cover the time period of interest—for example a service interval, an emissions regulatory period, and/or a service life of the aftertreatment device 102.

Figure 7:
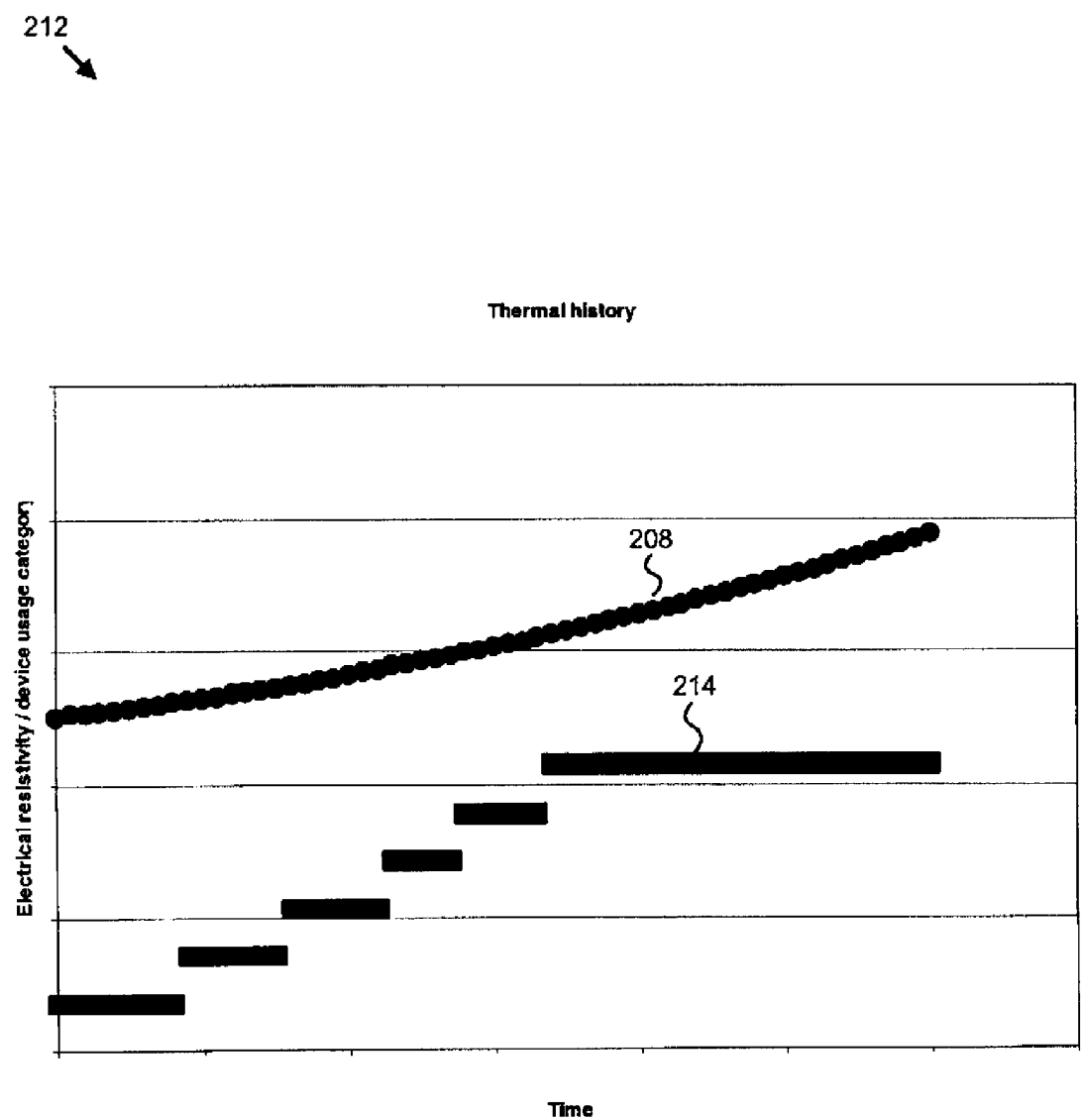
FIG. 7 is an illustration depicting one embodiment of a thermal history in accordance with the present invention.

FIG. 7 is an illustration depicting one embodiment of a thermal history 212 in accordance with the present invention. The thermal history 212 may comprise an electrical resistivity value 208 history and a device usage category 214 history. The device usage category 214 may be determined based on electrical resistivity value 208 thresholds from the thermal history 212. The slope of the electrical resistivity value 208 history may vary over time, for example as the frequency and temperature of regeneration events change.

The thermal history 212 may further include a thermal fatigue index (not shown) for the aftertreatment device which may be calculated from data such as the electrical resistivity value 208 history, a thermal gradient history, and the like. The thermal history 212 may further include a thermal deactivation index (not shown) for a catalyst associated with the aftertreatment device 102. For example, the thermal history 212 may comprise a time-equivalent for a selected high temperature known to deactivate a catalyst in a washcoat on the aftertreatment device 102, and the time-equivalent for the selected high temperature may be converted into a thermal deactivation index for the catalyst that may be used by an ECM 110 to adjust the operations of the system 100 accordingly.

Figure 8:
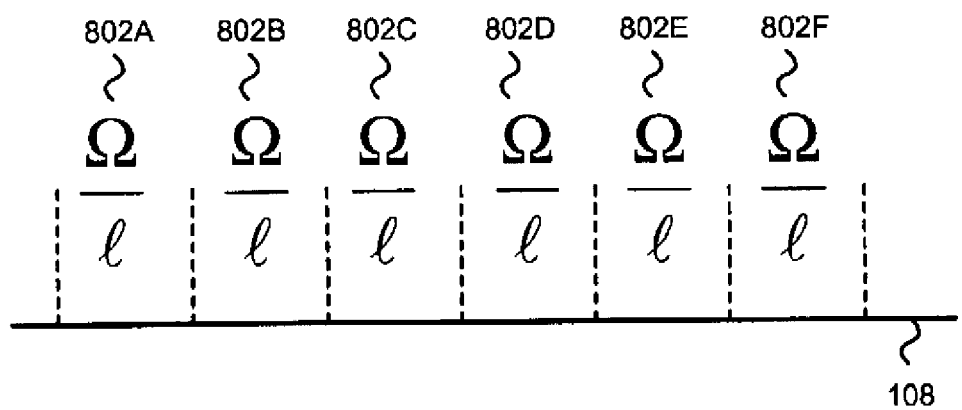
FIG. 8 is an illustration depicting a plurality of specified intervals of a thermal monitoring member in accordance with the present invention.

FIG. 8 is an illustration depicting a plurality of specified intervals of a TMM 108 in accordance with the present invention. In one embodiment, a service technician removes each TMM 108 to evaluate the thermal history 212 of the aftertreatment device 102. The service technician may measure the electrical resistance across each of a plurality of specified intervals 802A-802F, divide each electrical resistance value 204 by the length of the corresponding interval 802A-802F, and thereby determine a thermal history 212 with axial information about the aftertreatment device 102.

In one embodiment, the service technician may replace each removed TMM 108 with a new TMM 108 when returning the aftertreatment device to service. The technician may mark each new TMM 108 to indicate the number of times the TMMs 108 in the aftertreatment device 102 have been replaced. The markings may comprise information about the thermal history 212 as well, for example a cumulative time-equivalent at a temperature of interest. The technician may also provide the thermal history 212 to an ECM 110 installed on an application comprising the aftertreatment device 102. For example, the technician may pull the aftertreatment device 102 from a vehicle A, measure the TMMs 108, reinstall the aftertreatment device 102 on a vehicle B, and update the thermal history 212 on an ECM 110 installed on vehicle B.

The schematic flow chart diagram included herein is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 9:
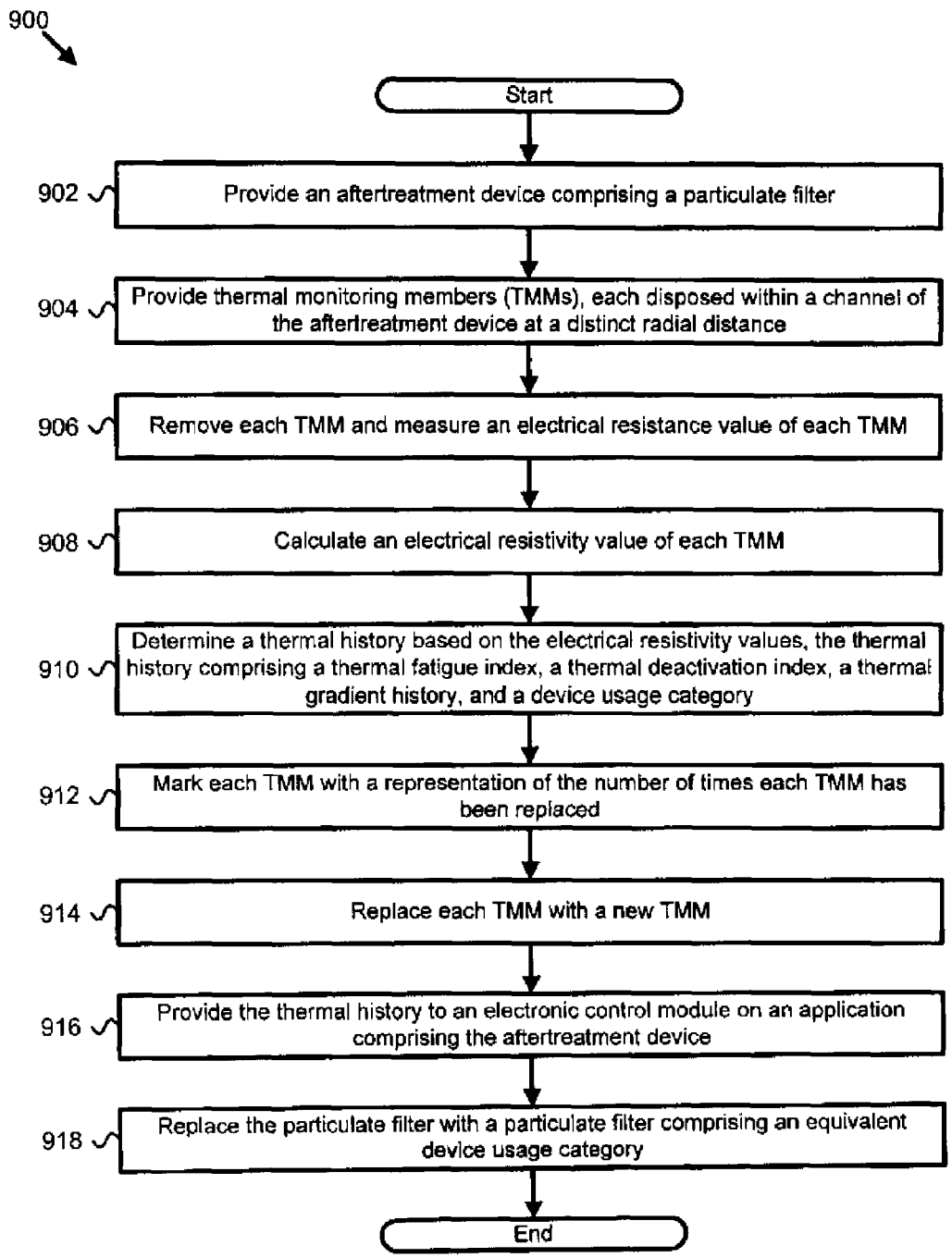
FIG. 9 is a schematic flow diagram depicting one embodiment of a method for determining a thermal history of an aftertreatment device in accordance with the present invention.

FIG. 9 is a schematic flow diagram depicting one embodiment of a method 900 for determining a thermal history 212 of an aftertreatment device 102 in accordance with the present invention. The method 900 may include providing 902 an aftertreatment device 102 comprising a particulate filter. The method may further include providing TMMs 108, each disposed within a channel of the aftertreatment device 102 at a distinct radial distance from the center of the device 102. A service technician may remove 906 each TMM 108 and measure an electrical resistance value 204 of at least a portion of each TMM 108. An electrical resistivity module 206 may calculate 908 an electrical resistivity value 208 of each TMM 108. The method 900 may include a thermal history module 210 determining a thermal history 212 based on the electrical resistivity values 208, and the thermal history 212 may comprise a thermal fatigue index, a thermal deactivation index, a thermal gradient history, and/or a device usage category 214.

The method 900 may include the service technician marking 910 each TMM 108 with a representation of the number of times each TMM 108 has been replaced, and replace each TMM 108 with a new TMM 108. The method 900 may further include the service technician providing 916 the thermal history 212 to an ECM 110 on an application comprising the aftertreatment device 102. The method 900 may also include replacing 918 the particulate filter with a particulate filter comprising an equivalent device usage category 214.

Figure 10:
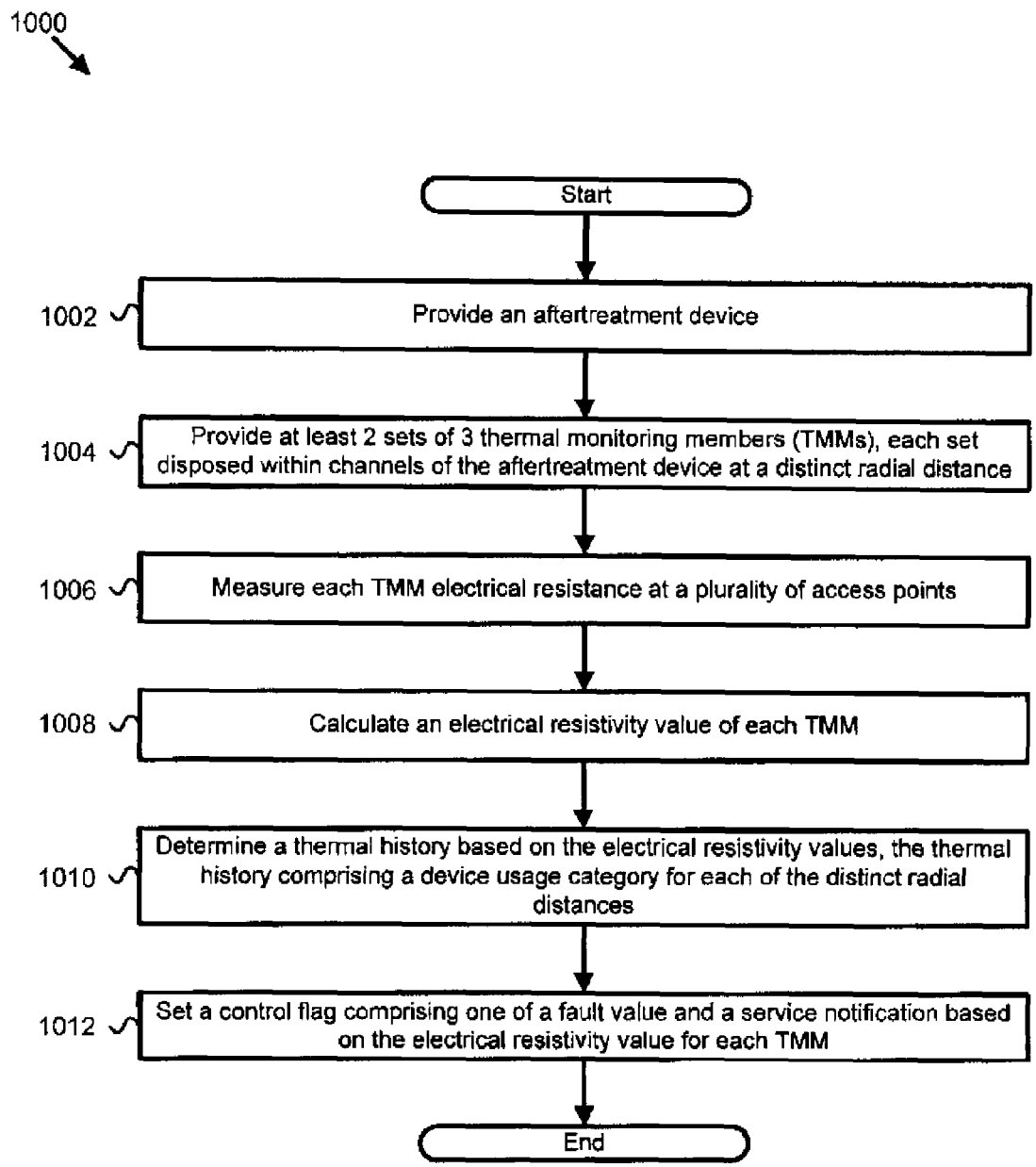
FIG. 10 is a schematic flow diagram depicting an alternate embodiment of a method for determining a thermal history of an aftertreatment device in accordance with the present invention.

FIG. 10 is a schematic flow diagram depicting an alternate embodiment of a method 1000 for determining a thermal history 212 of an aftertreatment device 102 in accordance with the present invention. The method 1000 may include providing 1002 an aftertreatment device, and providing 1004 at least two sets of three TMMs, each set disposed within channels of the aftertreatment device 102 at a distinct radial distance from the center of the aftertreatment device 102. The method 100 may further include an electrical resistance measurement module 202 measuring 1006 each TMM electrical resistance value 204 at a plurality of access points 114, and an electrical resistivity module 206 calculating 1008 an electrical resistivity value 208 of each TMM 108. The method 1000 may further include a thermal history module 210 determining a thermal history 212 based on the electrical resistivity values 208, the thermal history 212 comprising a device usage category 214 for each of the distinct radial distances. The method 1000 may further include an ECM 110 setting 1012 a control flag comprising one of a fault value and a service notification based on the electrical resistivity value 208 for each TMM 108.

From the foregoing discussion, it is clear that the invention provides a system, method, and apparatus for determining a time-temperature history of an aftertreatment device. The invention further provides a method for determining average temperature gradients experienced by the aftertreatment device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for determining a thermal history of an aftertreatment device, the apparatus comprising:
   an aftertreatment device comprising a substrate;
   at least one thermal monitoring member, each thermal monitoring member comprising:
      an element in thermal contact with the substrate; and
      an electrically conductive material that exhibits an electrical resistivity change upon exposure to temperature over a period of time.

2. The apparatus of claim 1, wherein the substrate comprises a plurality of channels, and wherein each thermal monitoring member is disposed within one of the channels.

3. The apparatus of claim 1, wherein the substrate comprises a porous foam, and wherein the aftertreatment device is formed with each thermal monitoring member disposed within the porous foam.

4. The apparatus of claim 1, wherein at least one thermal monitoring member comprises one of a plating and an etching on an outer surface of the substrate.

5. The apparatus of claim 4, wherein the one of a plating and an etching comprises a metal layer at least 0.1 mm thick.

6. The apparatus of claim 1, wherein each element comprises a wire formed from a member selected from the group consisting of Alumel®, Chromel®, stainless steel, Nichrome, Monel®, and constantan.

7. The apparatus of claim 1, wherein each element comprises a wire formed from a member selected from the group consisting of an aluminum based alloy, a copper based alloy, an iron based alloy, a nickel based alloy, and a chromium based alloys.

8. The apparatus of claim 1, further comprising a plurality of access points electrically coupled to each of the at least one thermal monitoring members.

9. The apparatus of claim 1, further comprising an electronic control module (ECM) comprising an electrical resistance measurement module configured to interpret an electrical resistance value of at least one portion of the at least one thermal monitoring member, an electrical resistivity module configured to calculate an electrical resistivity value for each portion of the at least one thermal monitoring member based on the electrical resistance value of each portion of the at least one thermal monitoring member, and a thermal history module configured to determine a thermal history of the aftertreatment device based on the electrical resistivity value for each portion of the at least one thermal monitoring member.

10. The apparatus of claim 9, wherein the thermal history module is further configured to determine a device usage category based on the thermal history.

11. The apparatus of claim 10, wherein the ECM further comprises a device usage display module configured to provide the device usage category to a display outlet, wherein the display outlet comprises a member selected from the group consisting of a dashboard lamp, a network data value, and a communicated signal.

12. The apparatus of claim 11, wherein the device usage display module is further configured to provide the thermal history to a display outlet.

13. A method for determining a thermal history of an aftertreatment device, the method comprising:
   providing an aftertreatment device comprising a substrate;
   providing at least one thermal monitoring member, each thermal monitoring member comprising:
      an element disposed within the substrate; and
      an electrically conductive material that exhibits an electrical resistivity change upon exposure to temperature over a period of time;
   measuring an electrical resistance value of at least one portion of the at least one thermal monitoring member;
   calculating an electrical resistivity value for each portion of the at least one thermal monitoring member based on the electrical resistance value of each portion of the at least one thermal monitoring member and a length of each portion of the at least one thermal monitoring member; and
   determining a thermal history of the aftertreatment device based on the electrical resistivity value for each portion of the at least one thermal monitoring member.

14. The method of claim 13, wherein the substrate comprises a plurality of channels, and wherein providing the at least one thermal monitoring member comprises placing each thermal monitoring member within one of the channels.

15. The method of claim 13, wherein the substrate comprises a porous foam, and wherein providing the at least one thermal monitoring member comprises forming the porous foam substrate around each thermal monitoring member.

16. The method of claim 13, wherein measuring the electrical resistance value of at least a portion of the at least one thermal monitoring member comprises measuring an electrical resistance of each thermal monitoring member at a pair of access points electrically coupled to each of the at least one thermal monitoring members.

17. The method of claim 16, further comprising setting a control flag based on the electrical resistivity value for each portion of the at least one thermal monitoring member, wherein the control flag comprises one of a fault value and a service notification.

18. The method of claim 13, wherein the thermal history comprises a thermal fatigue index for the aftertreatment device.

19. The method of claim 13, wherein the thermal history comprises a thermal deactivation index for a catalyst associated with the aftertreatment device.

20. The method of claim 13, wherein measuring the electrical resistance value of at least a portion of the at least one thermal monitoring member comprises removing each of the thermal monitoring members from the aftertreatment device, and measuring the electrical resistance of a plurality of specified intervals of each thermal monitoring member.

21. The method of claim 20, further comprising replacing each thermal monitoring member with a new thermal monitoring member.

22. The method of claim 20, further comprising marking each new thermal monitoring member with a representation of a number of times the thermal monitoring members have been replaced.

23. The method of claim 20, further comprising replacing each thermal monitoring member back into the aftertreatment device.

24. The method of claim 20, further comprising providing the thermal history to an electronic control module installed on an application comprising the aftertreatment device.

25. The method of claim 13, wherein the aftertreatment device comprises a particulate filter, wherein the thermal history comprises a device usage category, and wherein the method further comprises replacing the particulate filter with a particulate filter comprising an equivalent device usage category in response to a service event.

26. The method of claim 13, further comprising a plurality of thermal monitoring members, the method further comprising positioning each thermal monitoring member at a distinct radial distance from a center of the aftertreatment device.

27. The method of claim 26, wherein the thermal history comprises a temperature gradient history for the aftertreatment device.

28. The method of claim 13, the method further comprising providing at least three thermal monitoring members, each thermal monitoring member comprising an electrically conductive material exhibiting a distinct electrical resistivity change upon exposure to temperature over a period of time.

29. The method of claim 28, the method further comprising providing at least two sets of at least three thermal monitoring members, each set of at least three thermal monitoring members comprising thermal monitoring members with equivalent electrically conductive materials to the other sets, and the method further comprising positioning each set at a distinct radial distance from a center of the aftertreatment device.

30. The method of claim 29, further comprising determining a device usage value for each of the distinct radial distances, wherein the thermal history comprises a radial temperature gradient history for the aftertreatment device.

31. A system for determining a thermal history of an aftertreatment device, the system comprising:
   an aftertreatment device comprising a substrate and a plurality of channels;
   at least one thermal monitoring member, each thermal monitoring member comprising:
      an element disposed within one of the channels; and
      an electrically conductive material that exhibits an electrical resistivity change upon exposure to temperature over a period of time;
   a controller comprising:
      an electrical resistance measurement module configured to interpret an electrical resistance value of at least one portion of the at least one thermal monitoring member;
      an electrical resistivity module configured to calculate an electrical resistivity value for each portion of the at least one thermal monitoring member based on the electrical resistance value of each portion of the at least one thermal monitoring member; and
      a thermal history module configured to determine a thermal history of the aftertreatment device based on the electrical resistivity value for each portion of the at least one thermal monitoring member, wherein the thermal history module is further configured to determine a device usage category based on the thermal history.

32. The system of claim 31, wherein the controller comprises an ECM, wherein the ECM further comprises a device usage display module configured to provide the device usage category to a display outlet, wherein the display outlet comprises a member selected from the group consisting of a dashboard lamp, a network data value, and a communicated signal.

33. The system of claim 31, wherein the controller comprises a service tool, wherein the service tool comprises a device usage display module configured to provide the device usage category to a display outlet.

* * * * *